(12) United States Patent
Mizuno et al.

(10) Patent No.: US 7,544,925 B2
(45) Date of Patent: Jun. 9, 2009

(54) ENCODER INCLUDING ROTATING MEMBER, LIGHT SOURCE DEVICE AND PHOTODETECTING DEVICE INCLUDING A SCALE HAVING PHOTODETECTING ELEMENTS ARRANGED THEREON

(75) Inventors: Seiichiro Mizuno, Hamamatsu (JP); Takayuki Suzuki, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 11/605,474

(22) Filed: Nov. 29, 2006

(65) Prior Publication Data

US 2008/0083869 A1    Apr. 10, 2008

(30) Foreign Application Priority Data

Oct. 10, 2006   (JP) .......................... P2006-276600

(51) Int. Cl.
  *G01D 5/34* (2006.01)
(52) U.S. Cl. .......................... 250/231.13; 250/214 PR; 356/614; 341/13
(58) Field of Classification Search .......... 250/231.13–231.18; 33/1 N, 1 PT; 341/11, 13, 341/31; 356/614–617, 619
See application file for complete search history.

(56) References Cited

U.S. PATENT DOCUMENTS

| | | | | |
|---|---|---|---|---|
| 4,421,980 A | * | 12/1983 | Kuhne | 250/231.18 |
| 4,587,513 A | * | 5/1986 | Burrowes et al. | 341/13 |
| 4,849,621 A | * | 7/1989 | Yanase et al. | 250/214 PR |
| 5,774,219 A | | 6/1998 | Matsuura | |
| 6,127,676 A | * | 10/2000 | Tseng | 250/231.13 |
| 2002/0014581 A1 | * | 2/2002 | Yamamoto et al. | 250/231.13 |
| 2007/0114283 A1 | * | 5/2007 | Foo | 235/454 |

FOREIGN PATENT DOCUMENTS

| | | |
|---|---|---|
| JP | 60-47917 | 3/1985 |
| JP | 60-210718 | 10/1985 |
| JP | 61-14518 | 1/1986 |

(Continued)

*Primary Examiner*—Thanh X Luu
*Assistant Examiner*—Francis M LeGasse, Jr.
(74) *Attorney, Agent, or Firm*—Drinker Biddle & Reath LLP

(57) ABSTRACT

There is provided an encoder in which the absolute angle can be detected with high accuracy even when the irradiated position of light to be detected with respect to a scale is displaced from a reference. In the encoder 1, a bright portion 19 in which the light to be detected is irradiated to an area containing half rounds of arrangement lines L1 and L2 of a scale plate 11 is formed and also a dark portion 20 to which no light to be detected is irradiated is formed in the area excluding the bright portion 19 by passing the light to be detected through a rotating plate 8 having a toothed gear with a semi-circular opening portion 17 formed therein. Accordingly, in the encoder 1, even when the irradiated position of the light to be detected with respect to the scale plate 11 is displaced from the reference, the absolute angle of a measurement target can be detected with high accuracy by adding or subtracting the corrected amount based on the difference α° between the angle range corresponding to the width W at half maximum of the light intensity waveform P at the angle detection time and the reference angle range.

11 Claims, 11 Drawing Sheets

FOREIGN PATENT DOCUMENTS

| | | |
|---|---|---|
| JP | 61-169703 | 7/1986 |
| JP | 61-241621 | 10/1986 |
| JP | 62-163724 | 10/1987 |
| JP | 1-196514 | 8/1989 |
| JP | 8-10145 | 1/1996 |
| JP | 9-196706 | 7/1997 |
| JP | 11-148844 | 6/1999 |
| JP | 2000-146625 | 5/2000 |
| JP | 2002-48602 | 2/2002 |
| JP | 2002-139353 | 5/2002 |
| JP | 2003-315101 | 11/2003 |
| JP | 2004-317357 | 11/2004 |
| JP | 2005-121612 | 5/2005 |
| JP | 2006-119082 | 5/2006 |

\* cited by examiner

ENCODER INCLUDING ROTATING MEMBER, LIGHT SOURCE DEVICE AND PHOTODETECTING DEVICE INCLUDING A SCALE HAVING PHOTODETECTING ELEMENTS ARRANGED THEREON

BACKGROUND OF THE INVENTION

1. Field of the Invention

The present invention relates to an optical encoder.

2. Related Background Art

For example, an optical encoder described in Japanese Published Examined Patent Application No. H8-10145 is known as a conventional optical encoder. The conventional encoder has an optical scale in which lattice windows having different diffraction patterns are annularly arranged, and diffraction patterns of light to be detected irradiated to the lattice windows through a slit are picked up by an image sensor. The lattice windows are specified from the picked-up diffraction patterns, and also the positions of the lattice windows are specified on the basis of the positions of the diffraction patterns in the image, whereby the absolute angle of a measurement target is detected.

SUMMARY OF THE INVENTION

However, in the conventional optical encoder, the absolute angle is directly detected from the position of each specified lattice window. Therefore, when the arrangement relationship of the respective members constituting an optical system is displaced due to difficulties of disc processing of the scale, subsequent age-based deterioration or the like, and thus the irradiated position of the light to be detected with respect to the scale is displaced from a reference, the detection accuracy of the absolute angle is lowered.

The present invention has been implemented to solve the above problem, and has an object to provide an encoder that can detect an absolute angle with high accuracy even when the irradiated position of light to be detected with respect to a scale is displaced from a reference.

In order to solve the above problem, an encoder according to the present invention includes a rotating member; a light source device for emitting light to be detected to the rotating member; and a photodetecting device including a scale having a plurality of photodetecting elements arranged thereon, and an output portion for outputting an output signal based on the light intensity of the light to be detected made incident to the photodetecting elements through the rotating member, wherein the photodetecting elements are arranged along an annular arrangement line on the scale, and the rotating member is designed so that, in the scale, an area containing a part of the arrangement line is set as a bright portion to which the light to be detected is irradiated, and an area containing the other portion excluding the part of the arrangement line concerned is set as a dark portion to which no light to be detected is irradiated.

The encoder has the rotating member in which the area containing a part of the arrangement line in the scale having the plurality of photodetecting elements arranged annularly thereon is set as the bright portion to which the light to be detected is irradiated, and the area containing the other portion of the scale excluding the part of the arrangement line is set as the dark portion to which no light to be detected is irradiated. Accordingly, the center at half maximum of a one-dimensional profile of the output signal from the photodetecting elements is set as a reference point, and the absolute angle can be calculated by specifying the photodetecting element corresponding to the reference point. On the other hand, the angle range corresponding to the width at half maximum of the one-dimensional profile of the output signal (reference angle range) can be grasped from the configuration of the bright portion formed on the scale in advance. Here, when the irradiated position of the light to be detected with respect to the scale is displaced, the angle range corresponding to the width at half maximum of the one-dimensional profile of the output signal at the angle detection time is varied from the reference angle range by a fixed amount. Therefore, in this encoder, the variation amount of the angle range is calculated as a corrected amount, and the corrected amount is added to or subtracted from the absolute angle indicated by the reference point, whereby the absolute angle can be detected with high accuracy even when the irradiated position of the light to be detected with respect to the scale is displaced from the reference.

In addition, it is preferable that a semicircular light transmission portion whose diameter corresponds to the arrangement line is formed in the rotating member, and the bright portion is formed of the light to be detected passing through the light transmission portion. Furthermore, the light transmission portion is preferably an opening portion. When such a semicircular light transmission portion or opening portion as described above is used, it is less likely to be clogged with dust as compared with a case where a slit is used as in the case of the prior art, and the detection accuracy of the absolute angle can be suppressed from being reduced due to level reduction of the output signal, etc.

In addition, it is preferable that a semicircular light reflection portion whose diameter corresponds to the arrangement line is formed in the rotating member, and the bright portion is formed of the light to be detected reflected from the light reflection portion. In this case, as compared with the case where a slit is used as in the case of the prior art, clogging based on dust is less likely to occur, and the detection accuracy of the absolute angle can be suppressed from being reduced due to level reduction of the output signal, etc. Furthermore, the light source device can be arranged at the scale side, and thus the optical system can be miniaturized.

In addition, it is preferable that the light reflection portion is formed at a position displaced from the center of the optical axis of the light to be detected. In this case, the peak portion of the light to be detected can be prevented from being made directly incident to the photodetecting elements, so that the detection accuracy of the encoder can be suppressed from being reduced due to saturation of the photodetecting elements.

In addition, it is preferable that the photodetecting elements are arranged in a zigzag form along the arrangement line. In this case, the resolution of the angle detection can be enhanced while keeping the scale compact.

In addition, it is preferable that, in the scale, a light absorption film is formed in the area excluding the area where the photodetecting elements are arranged. Accordingly, the effect of multiple reflections of the light to be detected, etc., can be moderated, and the SN ratio of the one-dimensional profile of the output signal obtained from the photodetecting elements can be enhanced.

As described above, according to the encoder of the present invention, even when the irradiated position of the light to be detected with respect to the scale is displaced from the reference, the absolute angle can be detected with high accuracy.

DESCRIPTION OF THE PREFERRED EMBODIMENTS

A preferred embodiment of an encoder according to the present invention will be described in detail with reference to the drawings.

First Embodiment

Figure 1:
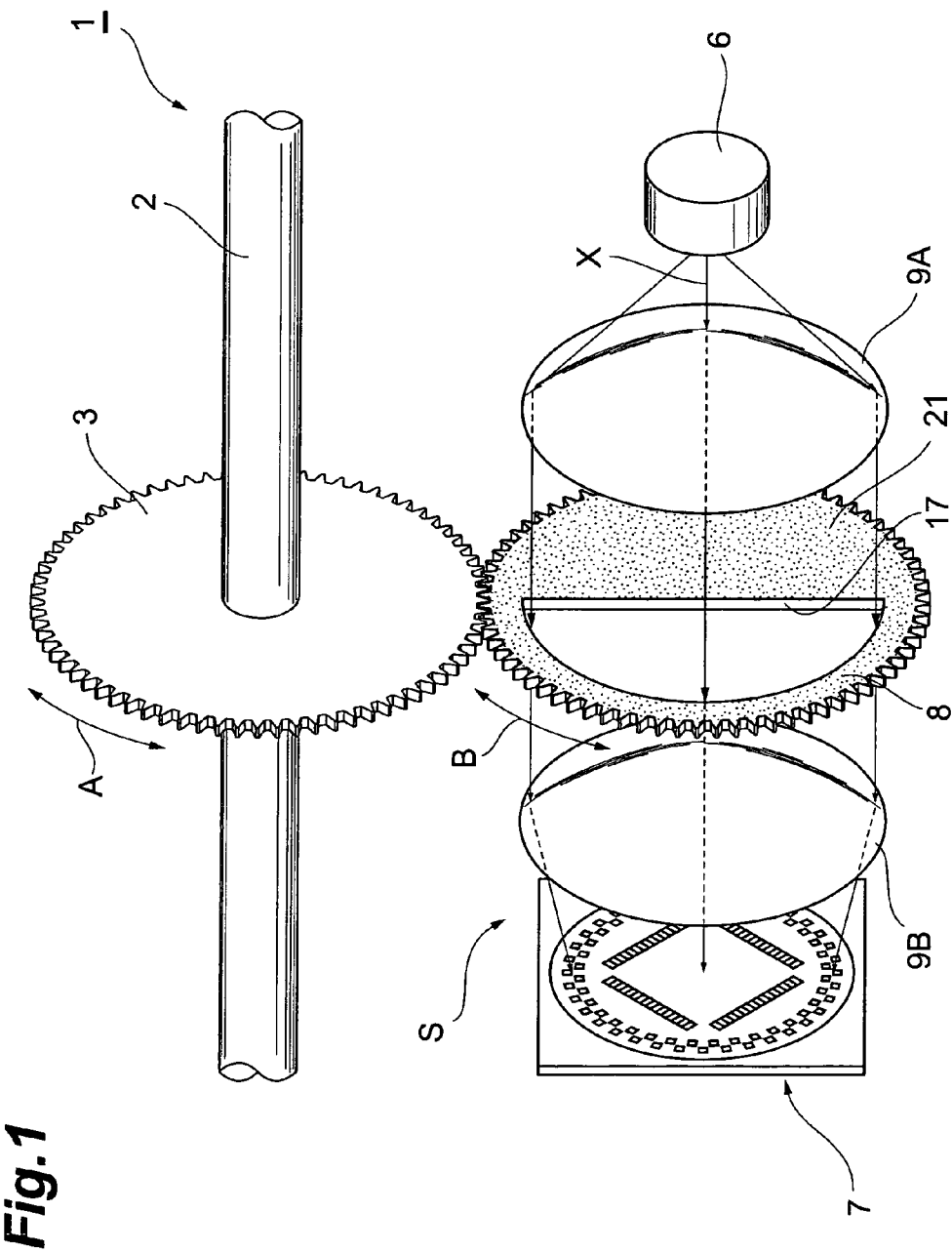
FIG. 1 is a perspective view showing an encoder according to a first embodiment of the present invention.

FIG. 1 is a perspective view showing an encoder according to a first embodiment of the present invention. The encoder 1 shown in FIG. 1 is a so-called absolute type rotary encoder, and it is a device for detecting the absolute angle of a measurement target (not shown) such as the handle of a vehicle or the like. This encoder 1 is equipped with a rotational shaft 2 linked to the measurement target, and a disk 3 having a toothed gear fixed to the rotational shaft 2. The disk 3 having the toothed gear is rotated in the direction of an arrow A in connection with the rotation of the rotational shaft 2 interlocked with the measurement target.

Figure 2:
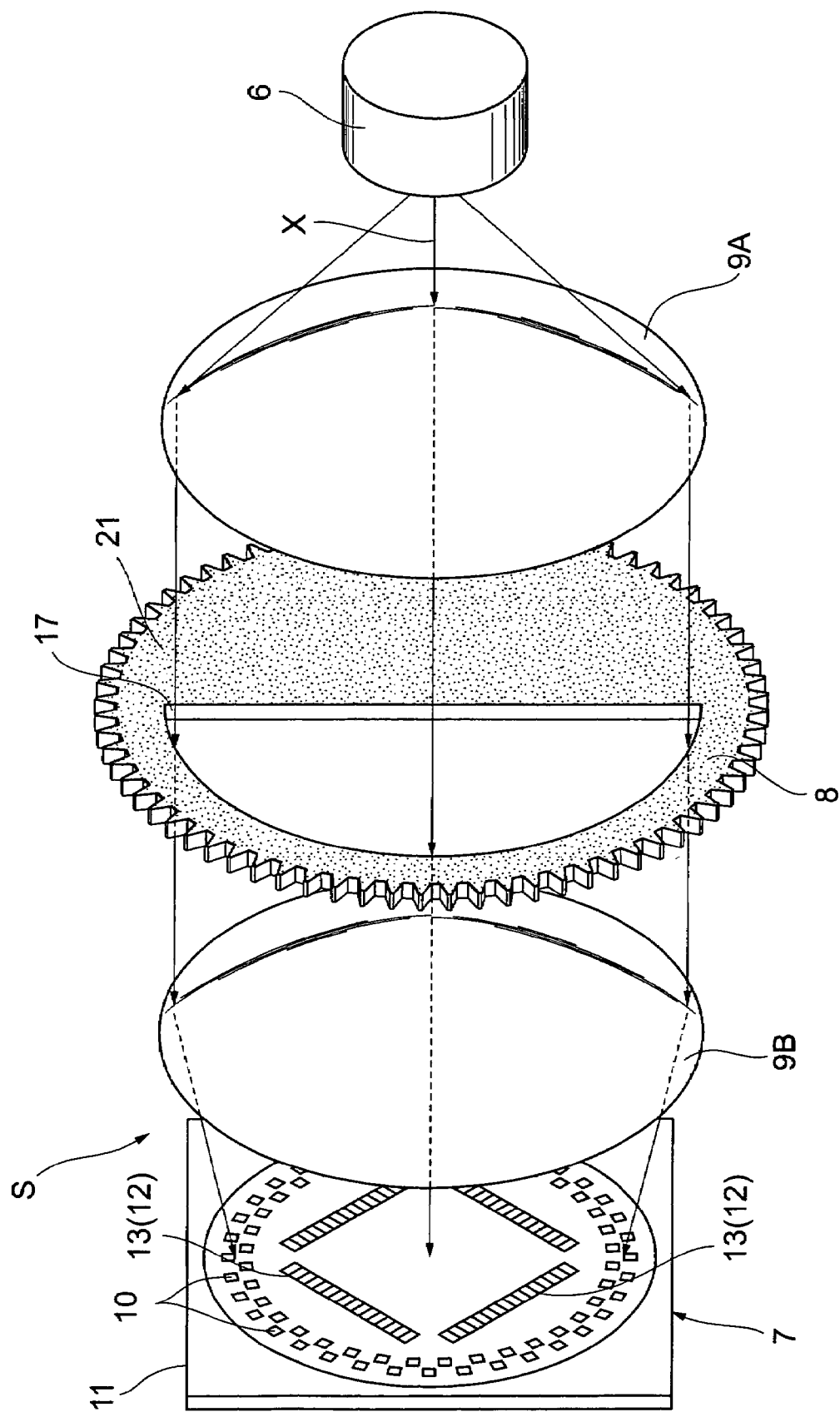
FIG. 2 is a perspective view showing an optical system of the encoder shown in FIG. 1.

FIG. 2 is a perspective view showing an optical system S of the encoder 1. As shown in FIG. 2, the optical system S of the encoder 1 constitutes an LED (light source device) 6 as a spot light source for emitting light to be detected, a photodetecting device 7 that is disposed so as to face LED 6 and photodetects the light to be detected, a rotating plate (rotating member) 8 having a toothed gear which is engaged with the disk 3 having the toothed gear, and a pair of collimating lens 9A and 9B disposed so as to sandwich the rotating plate 8 having the toothed gear therebetween.

Figure 3:
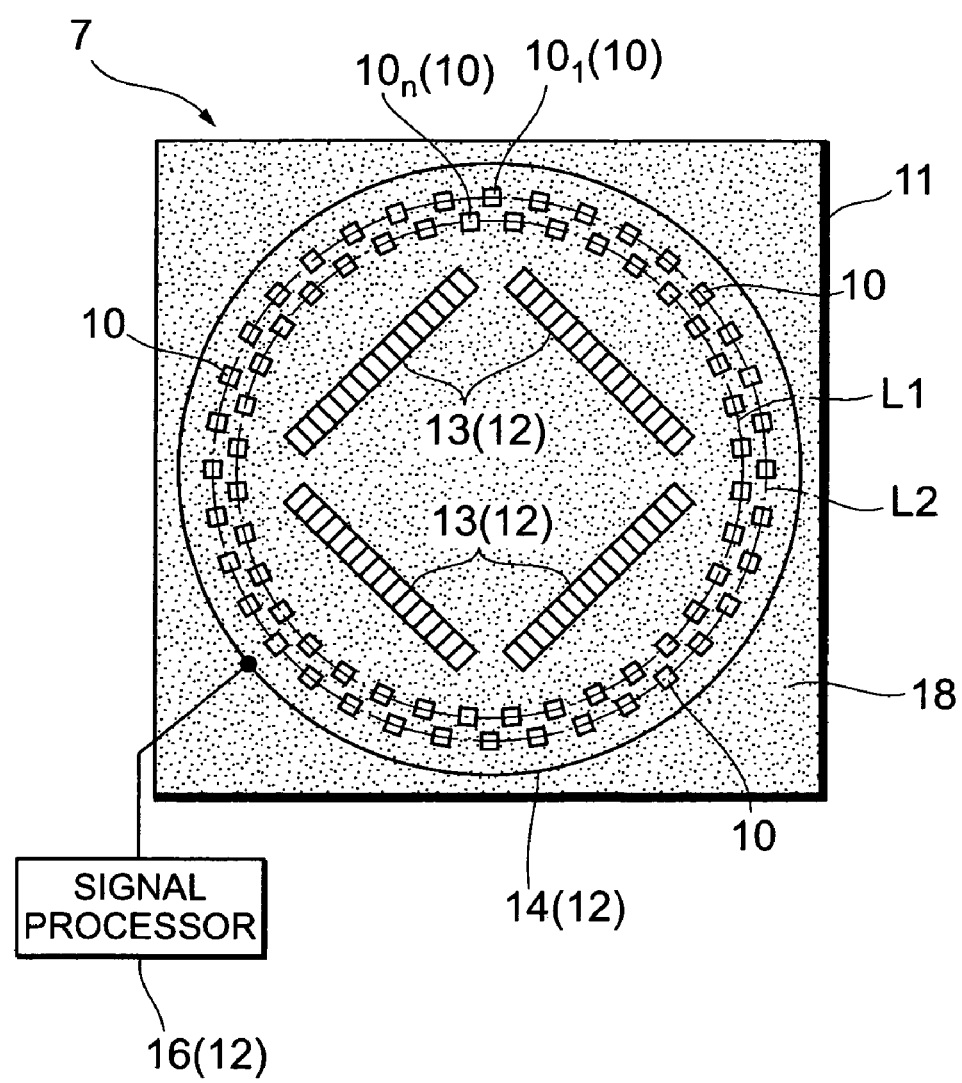
FIG. 3 is a plan view showing a photodetecting device.

As shown in FIG. 3, the photodetecting device 7 has a scale plate 11 having a plurality of PDs (photodetecting elements) 10 arranged thereon, and an output portion 12 for outputting an output signal from each PD 10. A first arrangement line L1 and a second arrangement line L2 are concentrically set on the scale plate 11, and the respective PDs 10 are annularly arranged in a zigzag form on the arrangement lines L1 and L2.

Angle information is allocated to the respective PDs 10 from the first PD $10_1$ (0°) to the last PD $10_n$ (359.5°), for example, at an angular interval of 0.5° in the clockwise direction. Furthermore, by print or the like, a light absorption film 18 of black resin which contains carbon, for example, is formed in the area on the surface of the scale plate 11 excluding the area where PDs 10 are arranged.

The output portion 12 has a plurality of (four in this embodiment) shift registers 13, a video line 14 and a signal processor 16. The respective shift registers 13 are arranged in a substantially rectangular form concentrically with the scale plate 11 at the inside of the respective arrangement lines L1 and L2, and supply scan signals for outputting the output signal based on the light intensity of the photodetected light to be detected. The video line 14 is concentrically arranged at the outside of the arrangement lines L1 and L2, and outputs an output signal from each PD 10 to the signal processor 16. The signal processor 16 outputs the output signal received from each PD 10 via the video line to the outside. A supply line (not shown) for a driving signal to each shift register 13 is connected between PD $10_1$ and PD $10_n$, for example.

Figure 4:
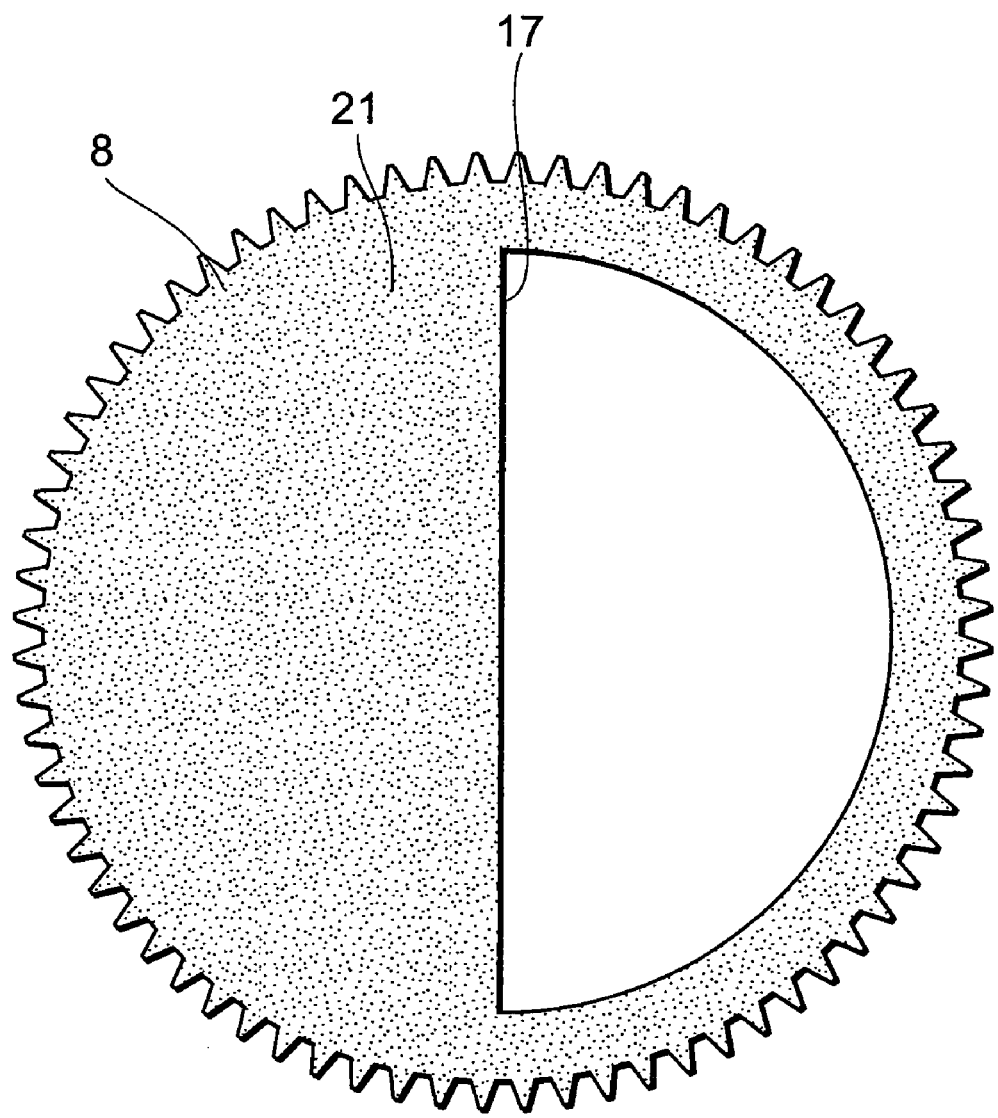
FIG. 4 is a plan view showing a rotating plate having a toothed gear.

On the other hand, as shown in FIG. 4, the rotating plate 8 having the toothed gear has an opening portion 17 through which a part of the light to be detected emitted from LED 6 is passed. The opening portion 17 is designed in a semicircular shape so as to be concentric with the rotating plate 8 having the toothed gear, and the diameter of the opening portion 17 is set to be larger than those of the arrangement lines L1 and L2 of the scale plate 11. When the measurement target rotates, the opening portion 17 is rotated in the direction of an arrow B around the optical axis X of the light to be detected in cooperation between the disc 3 having the toothed gear and the rotating plate 8 having the toothed gear as shown in FIG. 1. Furthermore, a light absorption film 21 is formed of the same material as the light absorption film 18 on the surface of the rotating plate 8 having the toothed gear in the area excluding the opening portion 17.

Figure 5:
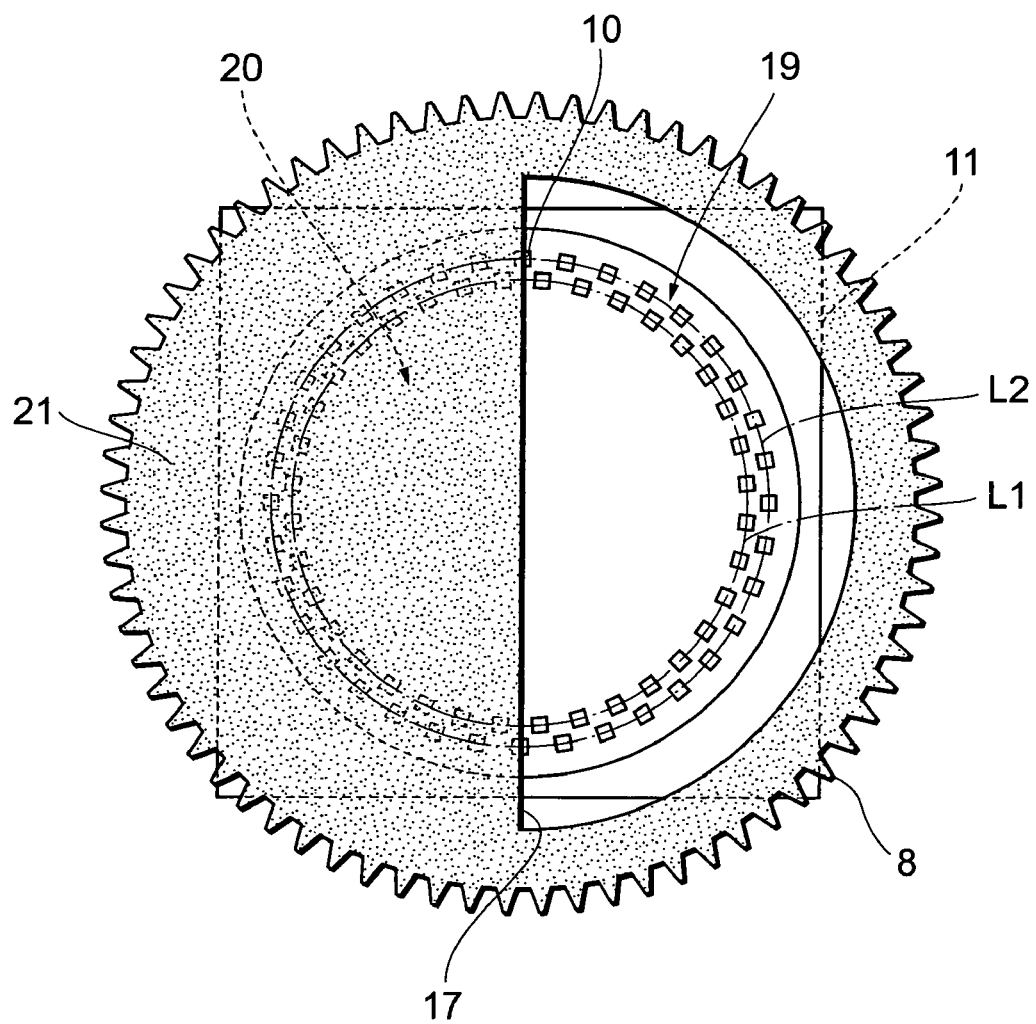
FIG. 5 is a diagram showing the arrangement relationship between an opening portion and a scale.

A part of the light to be detected that is emitted to the rotating plate 8 having the toothed gear and passes through the opening portion 17 is designed to have the same semicircular shape as the opening portion 17. Accordingly, as shown in FIG. 5, a bright portion 19 to which the light to be detected is irradiated is formed in an area containing the respective half rounds of the arrangement lines L1 and L2. Furthermore, a part of the light to be detected which does not pass through the opening portion 17 is absorbed by the light absorption film 21. Accordingly, a dark portion 20 to which no light to be detected is irradiated is formed in the remaining area of the scale plate 11 from which the bright portion 19 is excluded.

In such an optical system S, when the light to be detected is emitted from LED 6 as a spot light source, the light to be detected is collimated and bundled by the collimating lens 9A, and then made incident to the opening portion 17 as shown in FIG. 2. The light to be detected which is passed through the opening portion 17 and shaped into the semicircular form is converged by the collimating lens 9B and made incident to the respective PDs 10 corresponding to the half rounds of the arrangement lines L1 and L2 out of all the PDs 10 arranged annularly. The output signal based on the light intensity of the photodetected light to be detected is output from each PD 10, and output from the signal processor 16 to the outside.

Figure 6:
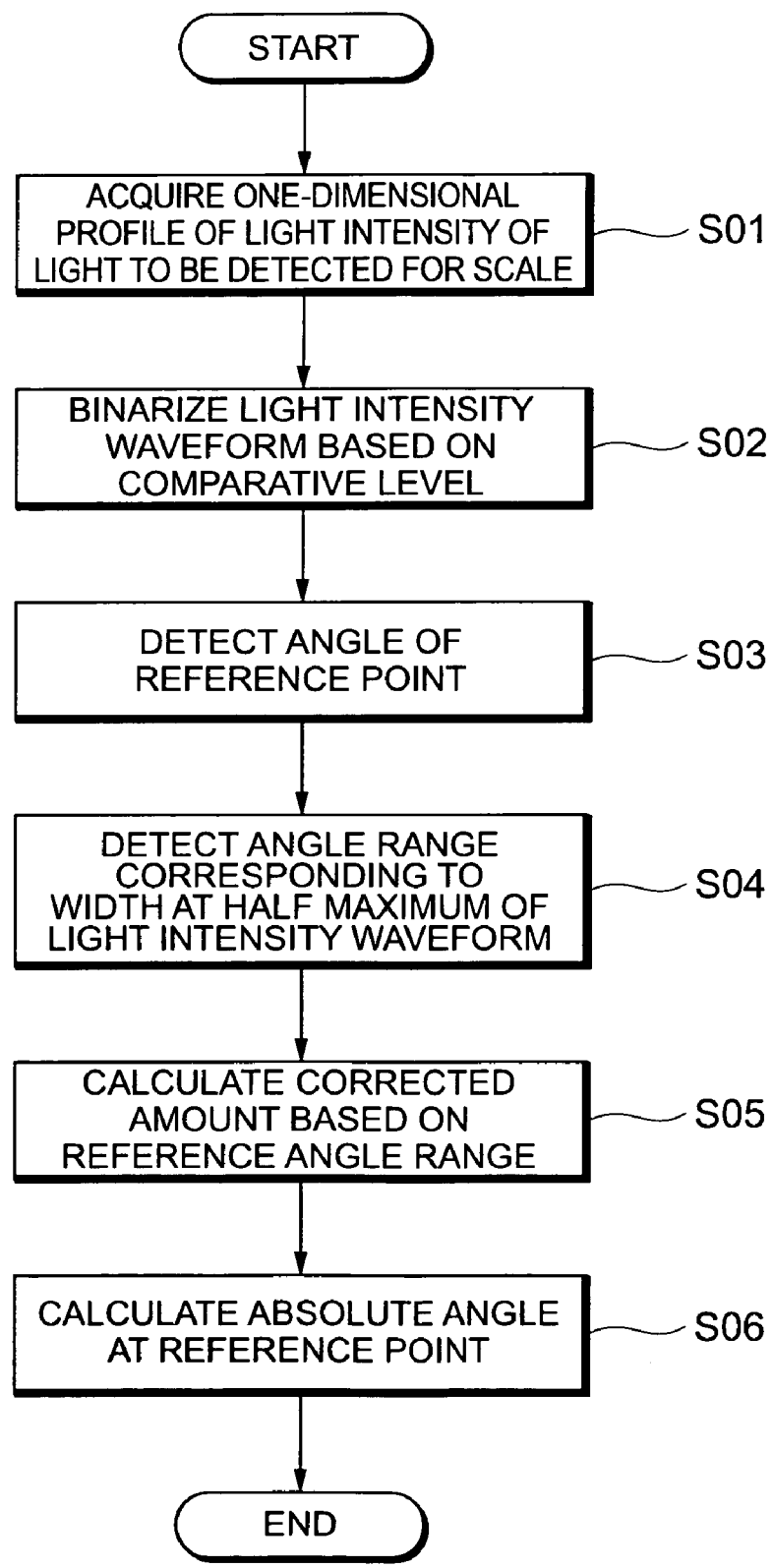
FIG. 6 is a flowchart showing the processing when an absolute angle of a measurement target is detected by the encoder shown in FIG. 1.

Next, the processing when the absolute angle of the measurement target is detected by the encoder 1 having the above construction will be described with reference to the flowchart of FIG. 6.

Figure 7:
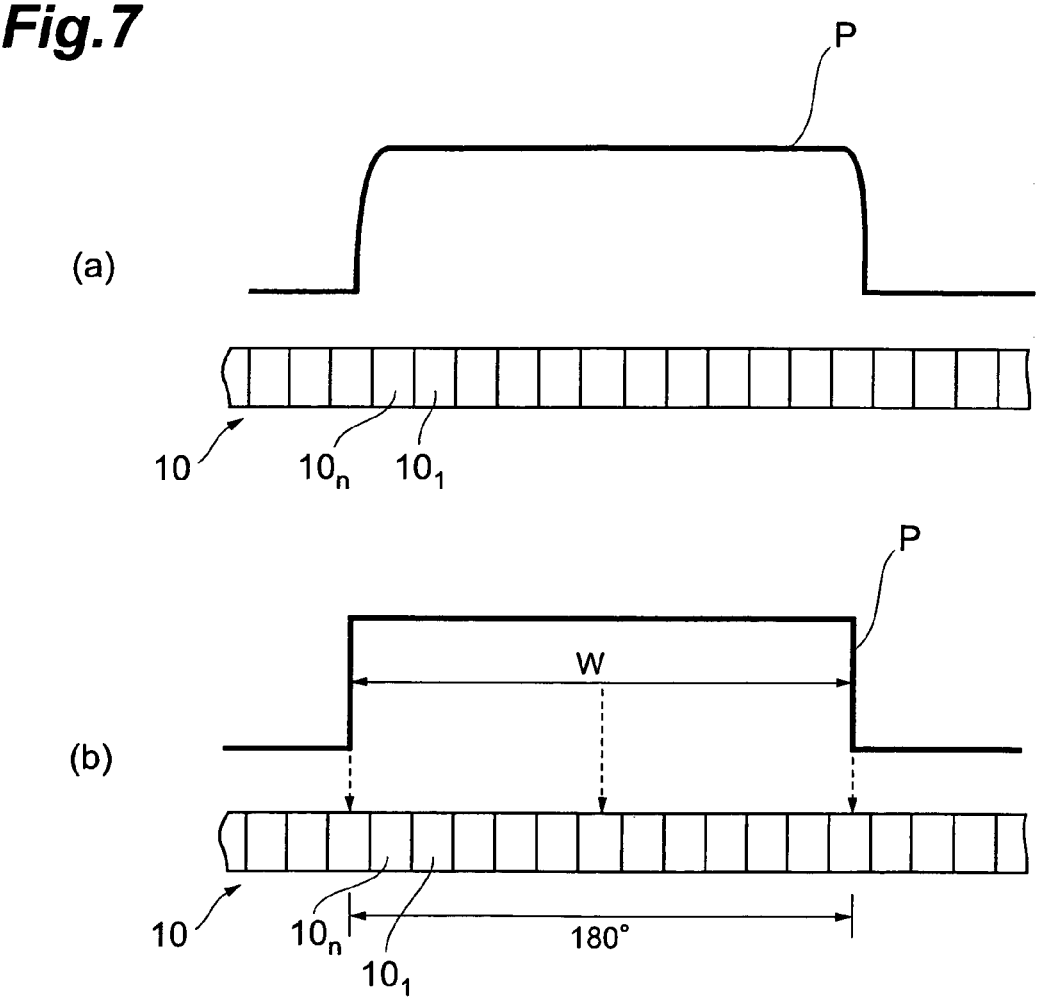
FIG. 7 is a diagram showing a one-dimensional profile of the light intensity of light to be detected.
Figure 8:
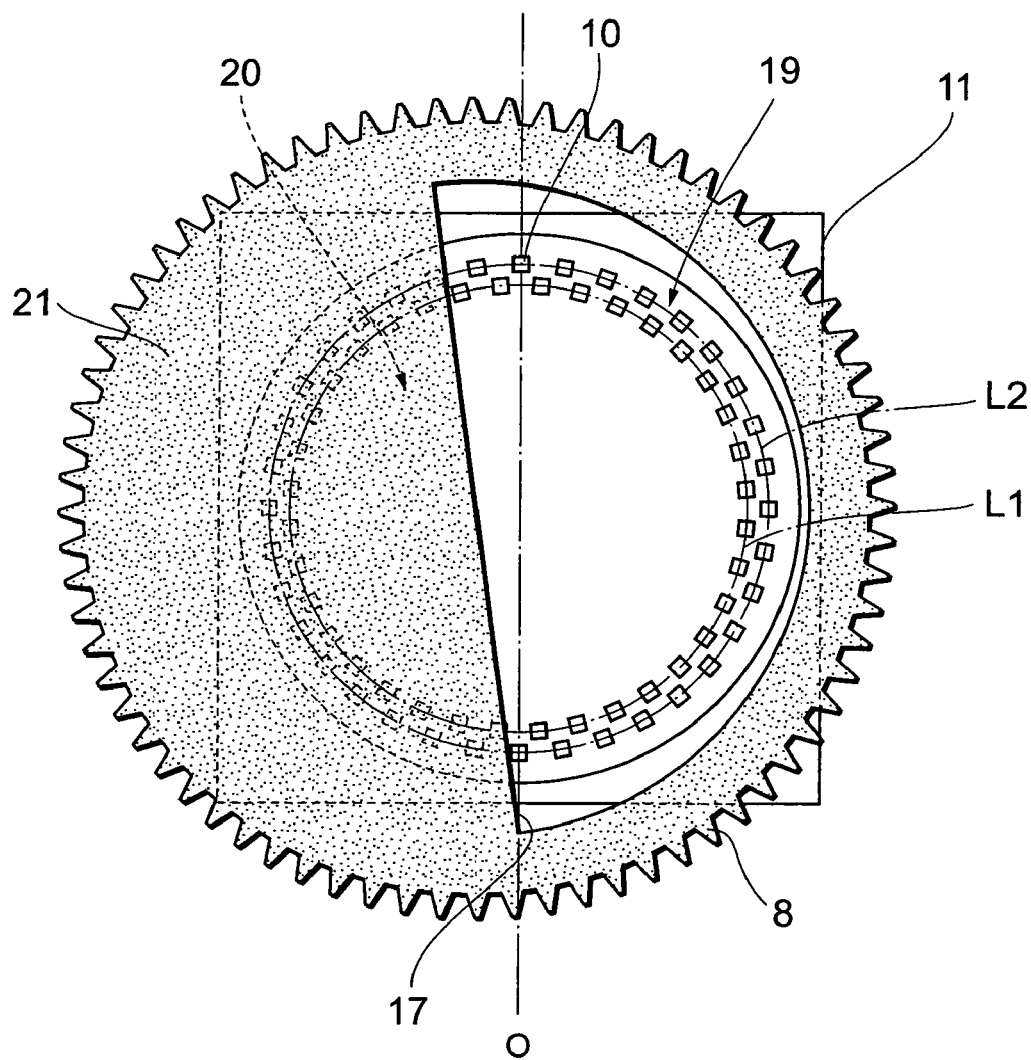
FIG. 8 is a diagram showing the arrangement relationship between the opening portion and the scale when positional displacement occurs.

First, the output signals obtained from the respective PDs 10 are collected, and a one-dimensional profile of the light intensity of the light to be detected with respect to the respective PDs 10 is acquired (step S01). At this time, in the encoder 1, the light to be detected passing through the opening portion 17 is made incident to the respective PDs 10 corresponding to the half rounds of the arrangement lines L1 and L2, and thus when the one-dimensional profile is analyzed, a broad light intensity waveform P having a substantially flat top portion is obtained as shown in FIG. 7(a).

Subsequently, the obtained light intensity waveform P is binarized on the basis of a predetermined comparative level (step S02). The PD 10 corresponding to the center at half maximum of the binarized light intensity waveform P is specified, and the angle of a reference point is detected on the basis of the angle information allocated to the PD 10 concerned (step S03). After the angle of the reference point is detected, the width W at half maximum of the light intensity waveform P is detected, and the angle range corresponding to the width W at half maximum is detected (step S04).

Figure 9:
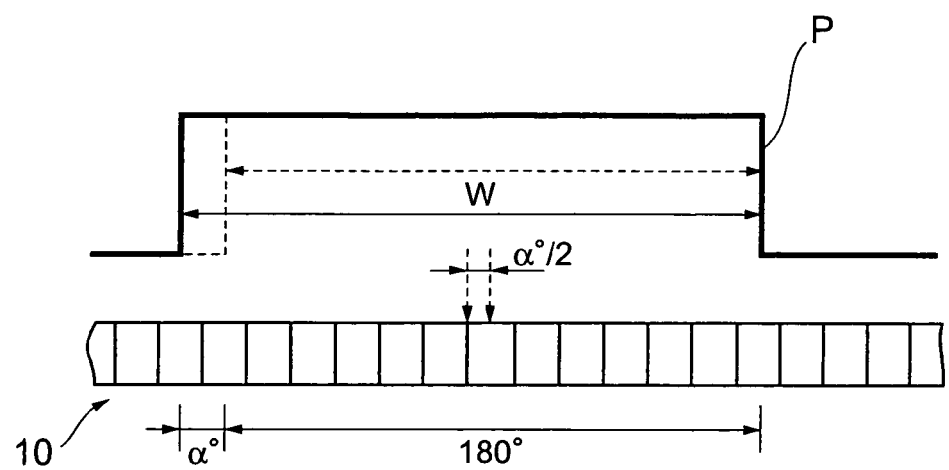
FIG. 9 is a diagram showing the one-dimensional profile of the light intensity of the light to be detected when positional displacement occurs.

Here, in the encoder 1, the semicircular opening portion 17 is formed in the rotating plate 8 having the toothed gear. Therefore, when the irradiated position of the light to be detected with respect to the scale plate 11 is not displaced from the reference point, the angle range corresponding to the width W at half maximum of the light intensity waveform P (hereinafter referred to as "reference angle range") is uniquely calculated as 180°. On the other hand, when the opening portion 17 has a positional displacement with respect to the scale plate 11 because of a shaft displacement, a rotational displacement or the like of the rotating plate 8 having the toothed gear and thus the irradiated position of the light to be detected with respect to the scale plate 11 is displaced from the reference, the bright portion 19 is formed in the area containing the half rounds or more of the arrangement lines L1 and L2 formed in the scale plate 11. In this case, as shown in FIG. 9, the angle range corresponding to the width W at half maximum of the light intensity waveform P is increased by $\alpha°$ with respect to the reference angle range, and the position of the reference point is displaced from the true value by $\alpha°/2$.

Therefore, when any difference $\alpha°$ occurs between the angle range detected in step S04 and the reference angle range, $\alpha°/2$ corresponding to this difference is calculated as a corrected amount for the positional displacement (step S05). Then, the corrected amount $\alpha°/2$ is added to (or subtracted from) the angle of the reference point detected in step S03, thereby calculating the absolute angle at the reference point (step S06).

As described above, in the encoder 1, the light to be detected is passed through the semicircular opening portion 17 formed in the rotating plate 8 having the toothed gear, whereby the bright portion 19 to which the light to be detected is irradiated is formed in the area containing the half rounds of the arrangement lines L1 and L2 on the scale plate 11, and the dark portion 20 to which no light to be detected is irradiated is formed in the area excluding the bright portion 19. Accordingly, the angle range corresponding to the width W at half maximum of the light intensity waveform P of the light to be detected (reference angle range) can be uniquely calculated as 180°. Accordingly, in the encoder 1, even when the irradiated position of the light to be detected with respect to the scale plate 11 is displaced from the reference, the absolute angle of the measurement target can be detected with high accuracy by calculating the corrected amount based on the difference $\alpha°$ between the angle range corresponding to the width W at the half maximum of the light intensity waveform P and the reference angle range at the angle detection time, and adding/subtracting the corrected amount to/from the angle indicated by the reference point.

Furthermore, in the encoder 1, the semicircular opening portion 17 is used to form the bright portion 19 and the dark portion 20, and thus the opening size is larger and it is less likely to be clogged with dust as compared with a case where a slit is used as in the case of the prior art. Accordingly, in the encoder 1, it is possible to suppress reduction of the detection accuracy of the absolute angle due to level reduction of the output signal, etc., even when the encoder 1 is used for a long time.

On the other hand, only the simple processing of outputting the output signal based on the light intensity of light to be detected made incident to each PD 10 to the outside is carried out at the photodetecting device 7 side, and thus the signal processing is rapidly carried out. Furthermore, a frame memory, etc., are not required, and miniaturization of the photodetecting device 7 and reduction of the cost can be performed. Still furthermore, in the photodetecting device 7, the respective shift registers 13 are arranged in the substantially rectangular form so as to be concentric with the scale plate 11 inside the arrangement lines L1 and L2. The photodetecting device 7 can be further miniaturized by arranging the respective shift registers 13 in an extra space inside the arrangement lines L1 and L2.

Furthermore, in the scale plate 11, the respective PDs 10 are arranged in the zigzag form over the annular arrangement lines L1 and L2. The above arrangement of PDs 10 can keep the scale plate 11 compact and enhance the resolution of the angle detection. In addition, the light absorption film 18 is formed in the area on the surface of the scale plate 11 in the area excluding the area where the PDs 10 are arranged. Accordingly, the effect of multiple reflection of the light to be detected, etc., can be moderated, and the SN ratio of the one-dimensional profile of the output signal obtained from the respective PDs 10 can be enhanced.

Second Embodiment

Figure 10:
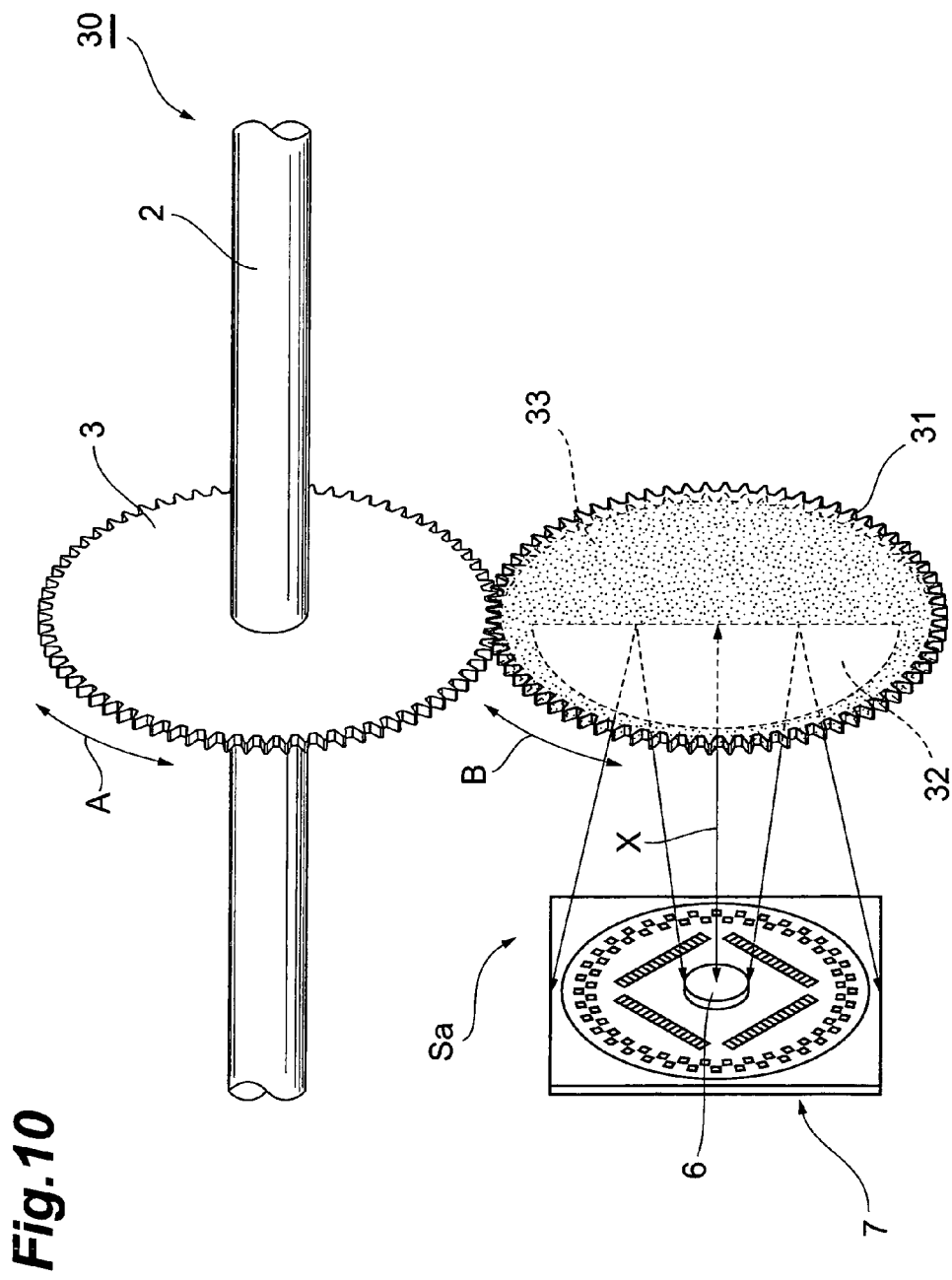
FIG. 10 is a perspective view showing an encoder according to a second embodiment of the present invention.

Subsequently, an encoder according to a second embodiment of the present invention will be described. As shown in FIG. 10, the difference of an encoder 30 according to the second embodiment from the first embodiment in which the light to be detected is passed through the opening portion 17 of the rotation plate 8 having the toothed gear resides in that light to be detected emitted from LED 6 is reflected from a light reflection portion 32 of the rotating plate 31 having the toothed gear when the bright portion 19 and the dark portion 20 are formed on the scale plate 11.

That is, in the optical system Sa of the encoder 30, the rotating plate 31 having the toothed gear has a light reflection portion 32 for reflecting a part of the light to be detected emitted from LED 6. The light reflection portion 32 is formed of aluminum thin film in a semicircular form so as to be concentric with the rotating plate 31 having the toothed gear. The diameter of the light reflection portion 32 is set to be larger than that of the arrangement lines L1 and L2 of the scale plate 11. Furthermore, in the rotating plate 31 having the toothed gear, a light absorption film 33 which is formed of black resin containing carbon, for example, is formed at the portion excluding the light reflection portion 32 by print or the like. Still furthermore, LED 6 is disposed at the center portion of the scale plate 11 in the photodetecting device 7.

In this encoder 30, when light to be detected is emitted from LED 6 to the rotating plate 31 having the toothed gear, a semicircular part of the light to be detected which impinges against the light reflection portion 32 is reflected to the photodetecting device 7 side. Accordingly, the bright portion 19 to which the light to be detected is irradiated is formed in the area containing the PDs 10 corresponding to the half rounds of the arrangement lines L1 and L2 in the scale plate 11 (see FIG. 5). Furthermore, a part of the light to be detected which does not impinge against the light reflection portion 32 is absorbed by the light absorption film 33. Accordingly, the dark portion 20 to which no light to be detected is irradiated is formed in the area excluding the bright portion 19 of the scale plate 11. The output signal based on the light intensity of the photodetected light to be detected is output from each PD 10, and then output from the signal processor 16 to the outside. Accordingly, according to this encoder 30, by analyzing the one-dimensional profile of the output signal of the light to be detected according to the same procedure as the first embodiment, the absolute angle of the measurement target can be detected with high accuracy even when the irradiated position of the light to be detected with respect to the scale plate 11 is displaced from the reference.

Furthermore, in the encoder 30, the semicircular light reflection portion 32 is used to form the bright portion 19 and the dark portion 20, and thus it is unlikely to be clogged with dust as in the case of the first embodiment. Accordingly, even when the encoder 30 is used for a long time, the detection accuracy of the absolute angle can be suppressed from being reduced due to level reduction of the output signal, etc. Furthermore, LED 6 is disposed at the scale plate 11 side, and thus the optical system Sa can be miniaturized.

The present invention is not limited to the above embodiments, and various modifications may be applied. For example, in the encoder 1 according to the first embodiment, the light absorption film 21 is formed in the area excluding the opening portion 17 in the rotating plate 8 having the toothed gear. However, in place of the light absorption film 21, a light reflection film (not shown) may be formed. In this case, the light to be detected which does not pass through the opening portion 17 is reflected from the light reflection film to the opposite side of the photodetecting device 7, so that the SN ratio of the one-dimensional profile of the output signal obtained from the respective PDs 10 can be enhanced.

Figure 11:
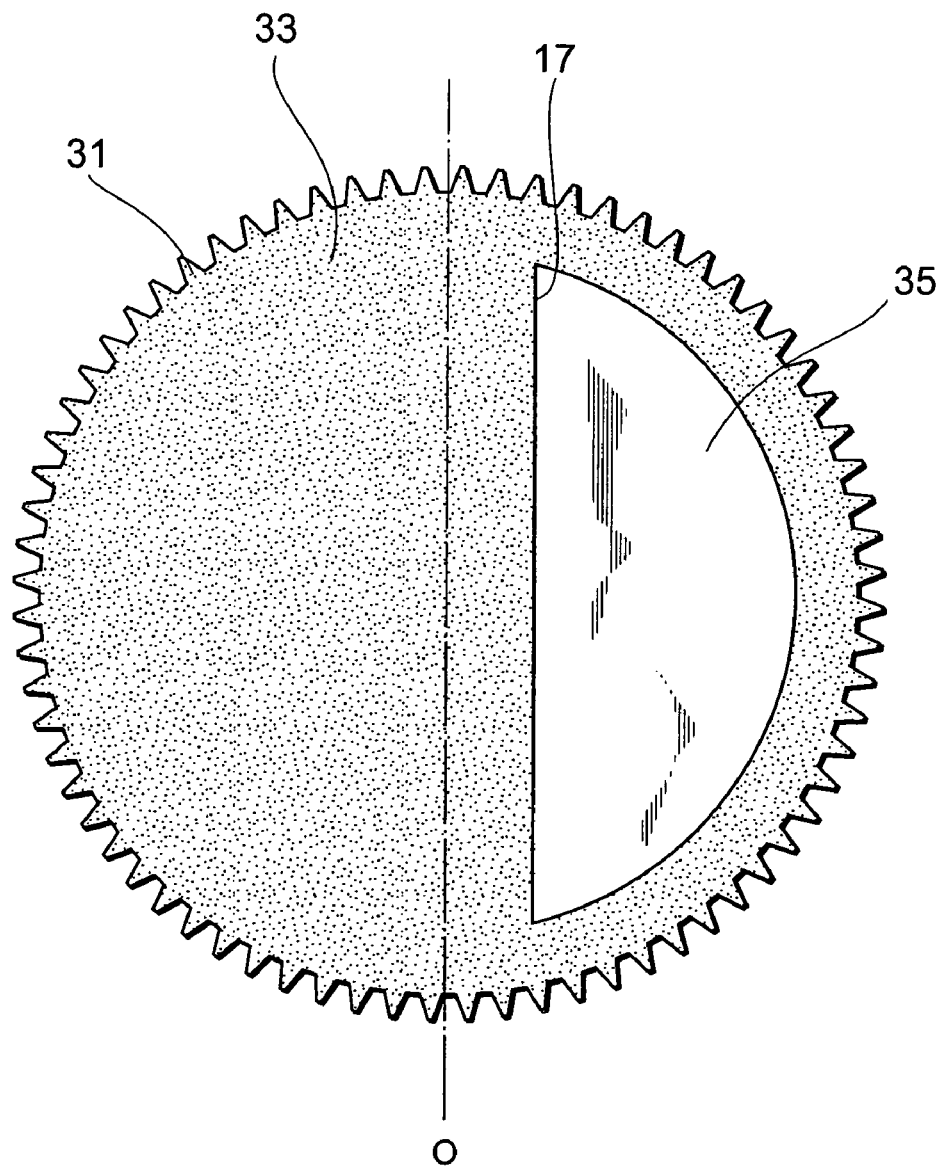
FIG. 11 is a plan view showing a rotating plate having a toothed gear according to a modification.

Furthermore, in the encoder 30 according to the second embodiment, such a semicircular reflection portion 35 that the side connecting both the ends of an arc is located at the arc side further than the center of the rotating plate 31 having the toothed gear may be formed as shown in FIG. 11, for example. When the reflection portion 35 is formed at a position displaced from the center of the rotating plate 31 having the toothed gear as described above, the reflection portion 35 and the center of the optical axis of the light to be detected are displaced from each other, and thus the peak portion of the light to be detected can be avoided from being directly made incident to the PDs 10. Accordingly, the detection accuracy of the encoder 30 can be suppressed from being reduced due to saturation of PDs 10. Furthermore, in the encoder 30 of the second embodiment, in place of the light reflection portion 32, the light absorption film 33 may be provided in the area inside the arrangement lines L1 and L2 around the center of the rotating plate 31 having the toothed gear when viewed from the optical axis direction of the light to be detected so that the reflection light of the light to be detected emitted from LED 6 is not directly returned to LED 6.

In addition, the rotating member having the toothed gear may be designed so that a partial area of the scale plate 11 is set as the bright portion to which the light to be detected is made incident and the other area is set as the dark portion to which no light to be detected is made incident, and for example, the rotating member having the toothed gear may be formed to have a semicircular shape and light absorption film or light reflection film may be formed on the surface of the rotating member.

What is claimed is:
1. An encoder comprising:
a rotating member;
a light source device for emitting light to be detected to the rotating member; and
a photodetecting device including a scale having a plurality of photodetecting elements arranged thereon, and an output portion for outputting an output signal based on the light intensity of the light to be detected made incident to the photodetecting elements through the rotating member, wherein
the photodetecting elements are arranged along an annular arrangement line on the scale, and
a semicircular light transmission portion whose diameter corresponds to the arrangement line is formed in the rotating member, and
the rotating member is designed so that, in the scale, an area containing a part of the arrangement line is set as a bright portion to which the light to be detected passing through the light transmission portion is irradiated, and an area containing the other portion excluding the part of the arrangement line concerned is set as a dark portion to which no light to be detected is irradiated, and the encoder further comprises:
a detector for detecting an angle associated with a reference point on the basis of angle information allocated to a photodetecting element corresponding to the center at half maximum of a light intensity waveform obtained from a one-dimensional profile acquired on the basis of output signals from the plurality of photodetecting elements, and for specifying the photodetecting element corresponding to the reference point.
2. The encoder according to claim 1, wherein the light transmission portion is an opening portion.
3. An encoder comprising:
a rotating member;
a light source device for emitting light to be detected to the rotating member; and
a photodetecting device including a scale having a plurality of photodetecting elements arranged thereon, and an output portion for outputting an output signal based on the light intensity of the light to be detected made incident to the photodetecting elements through the rotating member, wherein
the photodetecting elements are arranged along an annular arrangement line on the scale, and
a semicircular light reflection portion whose diameter corresponds to the arrangement line is formed in the rotating member, and
the rotating member is designed so that, in the scale, an area containing a part of the arrangement line is set as a bright portion to which the light to be detected reflected from the light reflection portion is irradiated, and an area containing the other portion excluding the part of the arrangement line concerned is set as a dark portion to which no light to be detected is irradiated, and the encoder further comprises:
a detector for detecting an angle associated with a reference point on the basis of angle information allocated to a photodetecting element corresponding to the center at half maximum of a light intensity waveform obtained from a one-dimensional profile acquired on the basis of output signals from the plurality of photodetecting ele- ments, and for specifying the photodetecting element corresponding to the reference point.

4. The encoder according to claim 3, wherein the light reflection portion is formed at a position displaced from the center of the optical axis of the light to be detected.

5. The encoder according to claim 1, wherein the photodetecting elements are arranged in a zigzag form along the arrangement line.

6. The encoder according to claim 1, wherein, in the scale, a light absorption film is formed in the area excluding the area where the photodetecting elements are arranged.

7. The encoder according to claim 3, wherein, in the scale, a light absorption film is formed in the area excluding the area where the photodetecting elements are arranged.

8. The encoder according to claim 1, wherein
the detector detects an absolute angle by detecting the width at half maximum of the light intensity waveform, and
the encoder further comprises:
a calculator for calculating the correction amount based on the difference between the angle range corresponding to the width at the half maximum and the angle range when irradiation position of the detection light is not displaced from the reference point, and for adding/subtracting the correction amount to/from the angle indicated by the reference point.

9. The encoder according to claim 3, wherein
the detector detects an absolute angle by detecting the width at half maximum of the light intensity waveform, and
the encoder further comprises:
a calculator for calculating the correction amount based on the difference between the angle range corresponding to the width at the half maximum and the angle range when irradiation position of the detection light is not displaced from the reference point, and for adding/subtracting the correction amount to/from the angle indicated by the reference point.

10. The encoder according to claim 1,
wherein the light intensity waveform is binarized on the basis of a predetermined comparative level.

11. The encoder according to claim 3,
wherein the light intensity waveform is binarized on the basis of a predetermined comparative level.

* * * * *